United States Patent [19]

Tsuchihashi et al.

[11] 3,910,958

[45] Oct. 7, 1975

[54] PROCESS FOR PREPARING ARYLACETIC ACIDS AND ESTERS THEREOF

[75] Inventors: Genichi Tsuchihashi, Tama; Katsuyuki Ogura, Sagamihara, both of Japan

[73] Assignee: Sagami Chemical Research Center, Tokyo, Japan

[22] Filed: Oct. 3, 1972

[21] Appl. No.: 294,600

[30] Foreign Application Priority Data
Oct. 4, 1971  Japan............................ 46-77123
Oct. 6, 1971  Japan............................ 46-77839

[52] U.S. Cl....... 260/340.5; 260/473 R; 260/476 R; 260/515 R; 260/515 A; 260/521 R; 260/549; 260/600; 260/607 A

[51] Int. Cl.................... C07d 317/48; C07c 63/52; C07c 69/76

[58] Field of Search......... 260/340.5, 473 R, 476 R, 260/521 R, 521 H, 515 R, 515 A

*Primary Examiner*—Henry R. Jiles
*Assistant Examiner*—Robert T. Bond
*Attorney, Agent, or Firm*—Wenderoth, Lind & Ponack

[57] ABSTRACT

A method of preparing arylacetic acids or alkylesters thereof comprising reacting an unsaturated sulfoxide with water or alcohol.

4 Claims, No Drawings

PROCESS FOR PREPARING ARYLACETIC ACIDS AND ESTERS THEREOF

This invention relates to a novel process for preparing an arylacetic acid or its ester expressed by the formula

RCH$_2$COOR$^3$ wherein R is an aryl group and R$^3$ is a hydrogen atom or alkyl group.

Some of the arylacetic acid derivatives are known to be useful as anodyne, antiphlogistic and pyretolytic drugs and also as drugs for curing diseases in man and animals. They can also be used as perfumes and plant growth inhibitors. Further, phenylacetic acid, as such or in the form of its salt, amide or ester (for example, potassium phenylacetate, methyl phenylacetate or phenylacetamide), is used as a precursor for the production pf penicillin. Phenylacetic acid is used for the production of phenylacetone, and some of the esters are used as perfumes.

A number of methods have previously been proposed for the production of arylacetic acids and the derivatives thereof. For example, a typical method of producing phenylacetic acid comprises hydrolyzing benzyl cyanide with sulfuric acid and water or an aqueous solution of sodium hydroxide while heating. Furthermore, a typical method of producing phenylacetic acid esters involves esterifying phenylacetic acid with the corresponding alcohols in the presence of a small amount of sulfuric acid.

The present invention provides a process for producing high purity arylacetic acids and the esters thereof in high yields by a novel reaction quite different from the conventional methods.

The process for producing arylacetic acids and the esters thereof comprises reacting an unsaturated sulfoxide having the formula

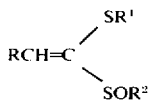

wherein R is an aryl group and each of R$^1$ and R$^2$ is an alkyl or aryl group,
with water or alcohols expressed by the general formula

R$^3$OH wherein R$^3$ is a hydrogen atom or alkyl group, in the presence of a mineral acid.

The above reaction is expressed by the following equation (1).

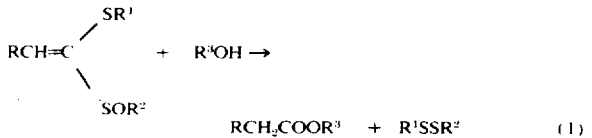

RCH$_2$COOR$^3$ + R$^1$SSR$^2$    (1)

The unsaturated sulfoxide used as the starting material in the present invention, namely, 1-alkyl(or aryl)-sulfinyl-1-alkyl(or aryl)-thio-2-arylethylene, can be obtained easily by a method which was discovered by the inventors of the present invention. This method comprises reacting an aromatic aldehyde of the formula RCHO, wherein R is the same as defined above, with a sulfoxide expressed by the formula R$^1$SCH$_2$SOR$^2$, wherein R$^1$ and R$^2$ are the same as defined above, in the presence of a base. Owing to the sulfide bond at the α-position, this sulfoxide is readily dehydrated and condensed to give the desired unsaturated sulfoxide. This reaction requires the presence of a small amount of a base. As the base, relatively strong bases, for example, alkali hydrides such as NaH, quaternary ammonium hydroxide, alkali hydroxides such as sodium hydroxide or potassium hydroxide, are preferably used. Sodium hydride and Triton B are the especially preferred bases. Desirably, the reaction is carried out using a solvent. As the solvent, organic solvents in general use such as dimethyl formamide, tetrahydrofuran or dioxane can be used. The reaction proceeds smoothly at room temperature to 120°C., but temperatures of 50° to 80°C. are especially preferred. These unsaturated sulfoxides and the method of producing them will be specifically described in the Examples below.

Substituents R$^1$ and R$^2$ in the unsaturated sulfoxide can be any alkyl or aryl groups. However, where R$^1$ and R$^2$ are the same alkyl or aryl group, the sulfoxide can be prepared especially easily, and as is seen from equation (1), R$^1$ and R$^2$ do not constitute substituents in the arylacetic acid or its ester, which is the final product of the present invention. As the staring material of this invention, an unsaturated sulfoxide in which both R$^1$ and R$^2$ are a methyl group is especially preferred because of the ease of handling. Examples of the aryl group represented by R are alkyl-substituted phenyls such as methylphehyl, halogen-substituted phenyls such as chlorophenyl, alkoxyphenyls such as methoxy or dimethoxyphenyl, and alkylidenedioxyphenyls such as methylenedioxyphenyl.

The other starting material R$^3$OH in the reaction of the present invention expressed by the above-mentioned equation (1) is water when R$^3$ is hydrogen, and aliphatic alcohols when R$^3$ is an alkyl group. The former yields arylacetic acid as a reaction product, and the latter yields the corresponding alkyl ester. Preferred alkyl groups are those having 1 to 10 carbon atoms, especially 1 to 5 carbon atoms.

The reaction in accordance with the present invention is performed in the presence of a mineral acid as a catalyst. Any mineral acids can be used, for example hydrogen halides, hydrohalic acids, sulfuric acid, nitric acid, phosphoric acid, and any other inorganic acids. But the use of hydrogen halide or hydrohalic acid is advantageous because it can be most easily removed after the reaction. Since the mineral acid acts as a catalyst, its amount may be a sufficient catalytic amount, but may also be about 1 percent based on the weight of the starting unsaturated sulfoxide. The use of it in greater amounts is permissible.

Preferably, the reaction is carried out in the presence of solvent. Where the starting R$^3$OH is water, an aprotic solvent, such as tetrahydrofuran, ethyl ether, 1,2-dimethoxyethane, dioxane, methylene chloride, chloroform or benzene is preferably used. When the staring R$^3$OH is an alcohol, the alcohol itself acts as solvent. It is not altogether necessary therefore to use another solvent. The reaction proceeds smoothly under mild conditions, such as at −30° to 100°C. Temperatures from 0° to 50°C. are preferred in actual operation because no special cooling or heating means is required. The reaction pressure is usually atmospheric pressure, and if desired, the pressure may either be elevated or reduced. The reaction time varies according to the type of the starting compounds and the reaction conditions to be applied, but generally the reaction is completed in about 20 minutes to several hours. However, since the reaction product formed is stable, it may be allowed to stand for several to about 20 hours. As a by-product, a disulfide of formula $R^1SSR^2$ is formed as seen in equation (1), but this by-product can be easily separated from the reaction product mixture by distillation under reduced pressure, column-chromatography and other suitable means.

Examples (A) illustrating the production of arylacetic acids and esters thereof, and Examples (B) illustrating the production of the unsaturated sulfoxide used as the starting material in this invention are given below.

EXAMPLE A1

191 mg of 1-methylsulfinyl-1-methylthio-2-phenylethylene was dissolved in 1.5 ml of 1,2-dimethoxyethane as solvent, and then 1 ml of 36% hydrochloric acid was added. Heat was generated by the addition of the concentrated hydrochloric acid. The unsaturated sulfoxide and water in the hydrochloric acid were reacted at room temperature for 3 hours. To the resulting reaction mixture, 50 ml. of methylene chloride and 5 ml. of water were added to extract the reaction product. The aqueous layer separated was further extracted with 50 ml. of methylene chloride. The organic layers resulting from these extractions were combined, and dried with anhydrous sodium sulfate, and concentrated at reduced pressure. After adding 30 ml. of ether, the concentrated product was extracted twice with 10 ml. of a saturated aqueous solution of sodium bicarbonate. The aqueous layer was acidified with hydrochloric acid, and extracted thrice with 30 ml. of methylene chloride. The organic layer was dried with anhydrous sodium sulfate, and 77 mg of colorless crystals were obtained. The yield was 63 percent based on the starting unsaturated sulfoxide (this basis for determining yields will be the same hereinafter). The melting point of the product was 69° to 75°C. The product was identified as phenylacetic acid from IR and a co-melting test.

EXAMPLE A2

300 mg. of 1-methylsulfinyl-1-methylthio-2-phenylethylene was dissolved in 10 ml. of anhydrous ethanol, and the solution was saturated with hydrogen chloride gas. The introduction of this gas was performed under ice cooling. The reaction was performed for 8 hours at room temperature, and the reaction mixture was concentrated at reduced pressure. By separation by column chromatography (silica gel, benzene), 179 mg of ethyl phenylacetate was obtained in a yield of 77 percent.

EXAMPLE A3

1-methylsulfinyl-1-methylthio-2-(p-methoxyphenyl)-ethylene was dissolved in 2 ml. of 1,2-dimethoxyethane, and 1 ml. of concentrated hydrochloric acid was added at room temperature. The reaction was performed for 15 hours at room temperature. The reaction mixture was extracted with 50 ml. of ether, and the resulting organic layer was extracted with an aqueous solution of potassium carbonate. The aqueous layer was acidified with hydrochloric acid, and then extracted thrice with 50 ml. of methylene chloride. The organic layer was dried with anhydrous sodium sulfate, and then concentrated at reduced pressure to give 62 mg of colorless crystals in a yield of 25 percent. The reaction product was recrystallized from a mixture of carbon tetrachloride and cyclohexane to afford p-methoxyphenylacetic acid having a melting point of 77° to 82°C.

EXAMPLE A4

274 mg of 1-methylsulfinyl-1-methylthio-2-(p-methoxyphenyl)ethylene was dissolved in 10 ml. of anhydrous ethanol, and the solution was saturated with hydrogen chloride gas under ice cooling. The reaction product was allowed to stand overnight at room temperature, and then concentrated at reduced pressure. The residue was separated by column chromatography (silica gel, n-hexane: benzene= 1:1 and benzene) to afford 206 mg of ethyl p-methoxyphenylacetate.

EXAMPLE A5

260 mg of 1-methylsulfinyl-1-methylthio-2-(p-chlorophenyl)ethylene was dissolved in 10 ml. of anhydrous ethanol, and the solution was saturated with hydrogen chloride gas under ice cooling. The reaction mixture was allowed to stand overnight at room temperature. The product was then concentrated at reduced pressure and subjected to column chromatography (silica gel, benzene:n-hexane=1:1) to afford 193 mg of ethyl p-chlorophenylacetate in a yield of 92.2 percent. The product was identified by comparing its IR with one of standard samples.

EXAMPLE A6

260 mg of 1-methylsulfinyl-1-methylthio-2-(3',4'-dimethoxyphenyl)ethylene was dissolved in 10 ml. of anhydrous ethanol, and the solution was saturated with hydrogen chloride gas at room temperature. The temperature of the solution rose to about 50°C. The reaction mixture was allowed to stand overnight at room temperature, and subjected to column chromatography (silica gel, benzene) to afford 86 mg of ethyl(3',4'-dimethoxyphenyl)acetate in a yield of 37.2 percent.

EXAMPLE A7

195 mg of 1-methylsulfinyl-1-methylthio-2-(3',4'-dimethoxyphenyl)ethylene was dissolved in 15 ml. of anhydrous ethanol, and hydrogen chloride gas was passed into the solution under ice cooling until the solution turned yellow. The reaction mixture was allowed to stand overnight at room temperature, and concentrated under reduced pressure. The residue was separated by column chromatography (silica gel, benzene) to afford 69 mg of ethyl(3',4'-dimethoxyphenyl)-acetate in a yield of 40 percent.

EXAMPLE A8

180 mg of 1-phenylsulfinyl-1-phenylthio-2-(p-chlorophenyl)ethylene was dissolved in 10 ml. of ethanol, and the solution was saturated with hydrogen chloride gas under ice cooling. The reaction mixture was allowed to stand overnight at room temperature, and then concentrated at reduced pressure. The residue was separated by column chromatography (silica gel, n-hexane and benzene) to afford 82 mg of ethyl p-chlorophenylacetate in a yield of 90 percent.

EXAMPLE A9

The same procedure as in Example A2 was repeated except that 254 mg of 1-methylsulfinyl-1-methylthio-2-(p-isopropylphenyl)ethylene was dissolved in 10 ml. of ethanol. There was obtained 171 mg of ethyl p-isopropylphenylacetate in a yield of 83 percent.

EXAMPLE A10

The same procedure as in Example A2 was repeated except that 282 mg of 1-isopropylsulfinyl-1-isopropylthio-2-(m-methylphenyl)ethylene was dissolved in 10 ml. of butanol. There was obtained 174 mg of butyl m-methylphenylacetate in a yield of 84.5 percent.

EXAMPLE A11

The same procedure as in Example A1 was repeated except that 100 mg of hydrobromic acid (specific gravity 1.48) and 360 mg of 1-phenylsulfinyl-1-phenylthio-2-(p-chlorophenyl)ethylene were used. There was obtained 121 mg of p-chlorophenylacetic acid in a yield of 72 percent.

EXAMPLE A12

522 mg of 1-methylsulfinyl-1-methylthio-2-(3′,4′-methylenedioxyphenyl)ethylene was dissolved in 10 ml. of ethanol, and hydrogen chloride gas was passed into the solution under ice cooling until the solution turned yellow (about 20 minutes). The reaction mixture was concentrated at reduced pressure, and subjected to column chromatography (silica gel, benzene) to afford 386 mg of ethyl(3′,4′-methylenedioxyphenyl-)acetate in a yield of 91 percent.

EXAMPLE B1

2.572 g of methyl methylthiomethyl sulfoxide, a methanol solution of 3 ml. of 40 % trimethylbenzyl ammonium hydroxide (Triton B) and 3 ml. of benzaldehyde were added to 5 ml. of tetrahydrofuran, and the mixture was refluxed for 4 hours. After adding 100 ml. of methylene chloride, the reaction mixture was washed with dilute sulfuric acid. The product was dried with anhydrous sodium sulfate, and concentrated at reduced pressure. The residue was separated by column chromatography (silica gel, methylene chloride) to afford 3.994 g of 1-methylsulfinyl-1-methylthio-2-phenylethylene as a colorless liquid having a boiling point of 149°–150°C./0.08 mmHg in a yield of 91.0 percent.

IR (neat): 1062 $cm^{-1}$
NMR ($CCl_4$): δ 2.62 s (3H), 2.26 s (3H), 7.51 s (1H), 7.32 m(3H), 7.85 m(2H)
Mass Spectrum (70 ev, 100°C.): m/e 212 ($M^+$, 7%), 197 (5%), 149 (100 %), 134(96 %), 116 (18 %), 115 (14 %), 89 (11 %)
Elemental Analysis For $C_{10}H_{12}OS_2$: Calculated: C; 56.65; H; 5.72; S; 30.33. Found: C; 56.56; H; 5.70; S; 30.20.

EXAMPLE B2

1.12 g of methyl methylthiomethyl sulfoxide was dissolved in 10 ml. of dioxane, and 1 ml. of a 40 % aqueous solution of Triton B and 1.25 ml. of benzaldehyde were added, and the mixture was stirred for 16 hours at 63°C. After adding 100 ml. of methylene chloride, 10 ml. of water and 0.5 ml. of concentrated hydrochloric acid were added, followed by shaking. The aqueous layer separated from the organic layer was extracted with 50 ml. of methylene chloride. The separated methylene chloride layer was combined with said organic layer. The combined layers were dried with anhydrous sodium sulfate, followed by concentration at reduced pressure. The dried product was subjected to column chromatography (silica gel and methylene chloride) to afford 2.00 g of 1-methylsulfinyl-1-methylthio-2-phenylethylene.

EXAMPLE B3

2.29 g of methyl methylthiomethyl sulfoxide was dissolved in 10 ml. of tetrahydrofuran, and 488 mg of sodium hydride was added under ice cooling. The mixture was stirred for 45 minutes, and 2.2 ml. of benzaldehyde was added at −70°C. The mixture was stirred for 3 hours at −70°C. and for 1 hour at room temperature. 50 ml. of methylene chloride was added, and the insoluble matter was separated by filtration. The filtrate was concentrated at reduced pressure, and subjected to column chromatography (silica gel and methylene chloride) to afford 1.804 g of 1-methylsulfinyl-1-methylthio-2-phenylethylene in a yield of 46 percent.

EXAMPLE B4

2.41 g of methyl methylthiomethyl sulfoxide was dissolved in 10 ml. of dimethylformamide, and 515 mg of sodium hydride was added, and the mixture was stirred 2 hours and 20 minutes. 2.5 ml. of benzaldehyde was added, and the mixture was further stirred for 3 hours at room temperature. 50 ml. of methylene chloride was added, and the mixture was filtered. The filtrate was concentrated at reduced pressure, and subjected to column chromatography (silica gel, methylene chloride) to afford 1,720 g of 1-methylsulfinyl-1-methylthio-2-phenylethylene in a yield of 41.6 percent.

EXAMPLE B5

1.05 g of methyl methylthiomethyl sulfoxide was dissolved in 7 ml. of dioxane, and 1.16 g of p-methoxybenzaldehyde andn 1 ml. of a 40 % aqueous solution of Triton B were added. The mixture was stirred for 23 hours at 80°C. After the same treatment as in Example B2, the product was subjected to column chromatography (silica gel, methylene chloride) to afford 884 mg of 1-methylsulfinyl-1-methylthio-2-(p-methoxyphenyl)ethylene in a yield of 63.8 percent. A sample for analytical purposes was rechromatographed.

IR (neat): 1059 $cm^{-1}$
NMR ($CCl_4$): δ 2.30 s (3H), 2.63 s (3H), 3.84 s (3H), 6.86 d (2H, J=8.4Hz), 7.86 d (2H, J=8.4Hz), 7.43 s (1H)
Mass Spectrum (70 ev, 100°C.): m/e 242 ($M^+$) 179 (base peak), 164 (96 %), 149 (31 %), 146 (28 %)
Elemental Analysis For $C_{11}H_{14}O_2S_2$: Calculated: C; 62.82; H,6.71; S15.25. Found: C,62.57; H,6.69; S,14.99.

EXAMPLE B6

951 mg of methyl methylthiomethyl sulfoxide and 1.17 g of p-methoxybenzaldehyde were dissolved in 10 ml. of tetrahydrofuran. To this solution was added 1 ml. of a 40 % methanol solution of Triton B, and the mixture was refluxed for 5 hours. Then 100 ml. of methylene chloride, 5 ml. of water and 2 ml. of 9N sulfuric acid were added, and the mixture was shaken. The aqueous layer separated from the organic layer was further extracted with 50 ml. of methylene chloride. The separated methylene chloride layer was combined with said organic layer. The combined layers were dried with anhydrous sodium sulfate and concentrated at reduced pressure. The concentrated product was subjected to column chromatography (silica gel, methylene chloride) to obtain 1.51 g of 1-methylsulfinyl-1-methylthio-2-(p-methoxyphenyl)ethylene in a yield of 100 percent.

EXAMPLE B7

1.078 g of methyl methylthiomethyl sulfoxide was dissolved in 7 ml. of dioxane, and 1.43 g of 3,4-dimethoxybenzaldehyde and 1 ml. of a 40 % aqueous solution of Triton B were added, and the mixture was stirred for 25 hours at 80°C. The reaction product was treated in the same way as in Example B2 and column-chromatographed (silica gel, methylene chloride) to afford 1.118 g of 1-methylsulfinyl-1-methylthio-2-(3',4'-dimethoxyphenyl)ethylene as a colorless liquid in a yield of 87.1 percent.

IR (neat): 1055 cm$^{-1}$

NMR (CDCl$_3$): δ 2.31 s (3H), 2.72 s (3H), 6.90d (1H, J=8.3Hz), 7.46xd (1H, J=8.3Hz, 2.4 Hz), 7.55(1H), 7.73 d (1H, J=2.4Hz)

Elemental Analysis For C$_{12}$H$_{16}$O$_3$S$_2$: Calculated: C,52.91; H,5.92; S,23.55. Found: C,53.04; H,5.88; S,23.52.

EXAMPLE B8

1.176 g of methyl methylthiomethyl sulfoxide was dissolved in 7 ml. of dioxane, and 1.33 g of p-chlorobenzaldehyde and 1 ml. of a 40 % aqueous solution of Triton B were added thereto. The mixture was stirred for 25 hours at 80°C. By operating in the same way as in Example B2, 1190 mg of 1-methylsulfinyl-1-methylthio-2-(p-chlorophenyl)ethylene was obtained in a yield of 72.8 percent.

IR (neat): 1062 cm$^{-1}$

NMR (CCl$_4$): δ 2.32 s (3H), 2.68 s (3H), 7.36 d (2H, J=8.7 Hz), 7.48 s (1H), 7.82 d (2H, J=8.7 Hz)

Elemental Analysis For C$_{10}$H$_{12}$OS$_2$Cl: Calculated: C,48.67; H,4.49. Found: C,48.63; H,4.81.

EXAMPLE B9

545 mg of phenyl phenylthiomethyl sulfoxide and 446 mg of p-chlorobenzaldehyde were dissolved in 5 ml. of tetrahydrofuran, followed by adding 0.5 ml. of a 40 % methanol solution of Triton B. The mixture was refluxed for 5.5 hours. 100 ml. of methylene chloride was added, and the reaction product was washed with dilute sulfuric acid, and then dried with anhydrous sodium sulfate. The product was concentrated at reduced pressure, and the residue was column-chromatographed (silica gel, methylene chloride) to afford 708 mg of 1-phenylsulfinyl-1-phenylthio-2-(p-chlorophenyl)ethylene as colorless crystals having a melting point of 87.5°–89.5°C.

IR (KBr): 1042 cm$^-$

NMR (CCl$_4$): δ 7.06 s (5H), 7.15–7.80 m (9H), 7.98 s (1H)

Elemental Analysis For C$_{20}$H$_{15}$OS$_2$Cl: Calculated: C,64.76; H,4.08; S,17.29. Found: C,64.36; H,3.85; S,17.47.

EXAMPLE B10

674 mg of methyl methylthiomethyl sulfoxide, 895 mg of piperonal and 0.7 ml. of Triton B were added to 5 ml. of tetrahydrofuran, and the mixture was heated under reflux for 9 hours. 50 ml. of methylene chloride was added, and the reaction product was washed with dilute sulfuric acid. The organic layer was dried with anhydrous sodium sulfate, and concentrated under reduced pressure, followed by column chromatography (silica gel, methylene chloride) to afford 870 mg of 1-methylsulfinyl-1-methylthio-2-(3',4'-methylenedioxyphenyl)ethylene in a yield of 81 percent.

IR; 1058 cm$^{-1}$ (film)

NMR (in CDCl$_3$): δ 2.34 s (3H), 2.76 s (3H), 6.05 s(2H), 6.87 d (1H, J=8Hz), 7.30 d ofd (1H, J=8 and 2Hz), 7.54 s (1H), 7.75 d (1H, J=2Hz).

Elemental analysis For C$_{11}$H$_{12}$OS$_2$: Calculated: C,51.54; H,4.72; S,25.02. Found: C,51.27; H,4.65; S,25.20.

What is claimed is:

1. A process for preparing a compound of the formula $$RCH_2COOR^3$$

wherein R is a member selected from the group consisting of phenyl, halophenyl, methoxyphenyl, dimethoxyphenyl, methylenedioxyphenyl and phenyl substituted by alkyl of 1–3 carbon atoms and R$^3$ is hydrogen or alkyl of 1–10 carbon atoms, which comprises reacting an unsaturated sulfoxide of the formula

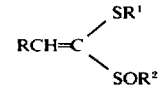

wherein R has the same meaning as defined above, and each of R$^1$ and R$^2$ is, independently of each other, a member selected from the group consisting of alkyl of 1–3 carbon atoms and phenyl, with a compound of the formula $$R^3OH$$

wherein R$^3$ has the same meaning as defined above, in the presence of a mineral acid at a temperature of from −30° to 100°C.

2. The process of claim 1 wherein the unsaturated sulfoxide is obtained by reacting an aromatic aldehyde of the formula $$R—CHO$$

wherein R is a member selected from the group consisting of phenyl, halophenyl, methoxyphenyl, dimethoxyphenyl, methylenedioxyphenyl and phenyl substituted by alkyl of 1–3 carbon atoms, with a sulfoxide of the formula $$R^1SCH_2SOR^2$$

wherein each of R$^1$ and R$^2$ is, independently of each other, a member selected from the group consisting of alkyl of 1–3 carbon atoms and phenyl, in the presence of a base at a temperature of from room temperature to 120°C.

3. The process of claim 1 wherein the reaction is carried out at 0° to 100°C.

4. The process of claim 1 wherein the mineral acid is a hydrogen halide or a hydrohalic acid.

* * * * *